US008526315B2

(12) United States Patent
Xu et al.

(10) Patent No.: US 8,526,315 B2
(45) Date of Patent: Sep. 3, 2013

(54) FLOW STATE ATTRIBUTES FOR PRODUCING MEDIA FLOW STATISTICS AT A NETWORK NODE

(75) Inventors: Xiaode Xu, Fremont, CA (US); Chien-Hsun Wang, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 157 days.

(21) Appl. No.: 11/895,113

(22) Filed: Aug. 23, 2007

(65) Prior Publication Data

US 2009/0052458 A1    Feb. 26, 2009

(51) Int. Cl.
| H04J 1/16 | (2006.01) |
| H04L 1/00 | (2006.01) |
| H04J 3/16 | (2006.01) |
| G06F 15/173 | (2006.01) |

(52) U.S. Cl.
USPC ............ 370/252; 340/246; 340/469; 709/224

(58) Field of Classification Search
USPC .......... 370/241, 246, 248–253, 469; 709/224
See application file for complete search history.

(56) References Cited

U.S. PATENT DOCUMENTS

| 4,684,872 | A | 8/1987 | Stewart |
| 5,953,049 | A | 9/1999 | Horn et al. |
| 6,016,430 | A | 1/2000 | Shinomiya |
| 6,044,081 | A | 3/2000 | Bell et al. |
| 6,253,270 | B1 | 6/2001 | Ajanovic et al. |
| 6,275,889 | B1 | 8/2001 | Saito |
| 6,545,979 | B1 | 4/2003 | Poulin |
| 6,590,867 | B1 | 7/2003 | Ash et al. |
| 6,628,608 | B1 | 9/2003 | Lau et al. |
| 6,771,644 | B1 | 8/2004 | Brassil et al. |
| 6,876,632 | B1 | 4/2005 | Takeda |
| 6,947,417 | B2 | 9/2005 | Laursen et al. |
| 7,310,334 | B1 * | 12/2007 | FitzGerald et al. ........... 370/389 |
| 7,422,330 | B2 | 9/2008 | Magarill |
| 7,936,695 | B2 * | 5/2011 | Oran ............................. 370/252 |
| 2002/0014282 | A1 | 2/2002 | Andersson et al. |
| 2002/0051464 | A1 | 5/2002 | Sin et al. |
| 2002/0176404 | A1 | 11/2002 | Girard |
| 2002/0186661 | A1 | 12/2002 | Santiago et al. |
| 2003/0016627 | A1 * | 1/2003 | MeLampy et al. ............ 370/235 |
| 2003/0035384 | A1 | 2/2003 | Cline et al. |
| 2003/0076850 | A1 | 4/2003 | Jason, Jr. |

(Continued)

OTHER PUBLICATIONS

T. Friedman et al., RFC 3611—RTP Control Protocol Extended Reports, Nov. 2003, Abstract, Section 4.6 pp. 21-24.*

(Continued)

*Primary Examiner* — Un C Cho
*Assistant Examiner* — Jeremy Costin
(74) *Attorney, Agent, or Firm* — Baker Botts L.L.P.

(57) ABSTRACT

A method in one embodiment includes allocating, by a node of a network, a flow label attribute identifying a media flow associated with a Session Description Protocol (SDP) media session. The media flow is between a sender and receiver nodes over a media transmission path of the network. The node further specifying a flow state attribute to generate media flow information and communicating the flow label and the flow state attribute to downstream nodes in the media transmission path. It is emphasized that this abstract is provided to comply with the rules requiring an abstract that will allow a searcher or other reader to quickly ascertain the subject matter of the technical disclosure.

17 Claims, 5 Drawing Sheets

(56) References Cited

U.S. PATENT DOCUMENTS

| | | |
|---|---|---|
| 2003/0163272 A1 | 8/2003 | Kaburlasos et al. |
| 2004/0052259 A1* | 3/2004 | Garcia et al. .................. 370/392 |
| 2004/0073641 A1 | 4/2004 | Minhazuddin |
| 2004/0073690 A1 | 4/2004 | Hepworth et al. |
| 2004/0078811 A1 | 4/2004 | Urdang |
| 2004/0196840 A1* | 10/2004 | Amrutur et al. .............. 370/389 |
| 2004/0213152 A1 | 10/2004 | Matuoka et al. |
| 2005/0007959 A1 | 1/2005 | Tomonaga et al. |
| 2005/0091190 A1* | 4/2005 | Klemets ............................ 707/1 |
| 2005/0219151 A1 | 10/2005 | Li et al. |
| 2006/0077891 A1 | 4/2006 | Smith et al. |
| 2006/0291450 A1 | 12/2006 | Ramachandran et al. |
| 2007/0008896 A1 | 1/2007 | Green et al. |
| 2007/0121523 A1 | 5/2007 | Morandin |
| 2007/0192459 A1 | 8/2007 | Horimoto et al. |
| 2008/0215704 A1* | 9/2008 | Curcio et al. ................. 709/217 |
| 2008/0267185 A1* | 10/2008 | Biskner ......................... 370/392 |

OTHER PUBLICATIONS

M. Handley et al., RFC 4566—SDP: Session Description Protocol, Jul. 2006, pp. 1, 8, 9, 21, 22.*

* cited by examiner m=audio 18700 RTP/AVP 18 101
c=IN IP6 2001:DB8:ffff:2::5efe:ce7b:1464
a=sendrecv
a=flowlabel:1234
a=rtpmap:18 G729/8000
a=fmtp:18 annexb=no
a=rtpmap:101 telephone-event/800
a=fmtp:101 0-16
a=ptime:20

FIG. 3

41 {
v=0
o=CiscoSystemsSIP-GW-UserAgent 6976 6360
    IN IP6 2001:DB8:ffff2::5efe:ce7b:1464
s=SIP Call
t=0 0
a=flowstats:rfc3550 closs ijitter
}

42 {
m=audio 18700 RTP/AVP 18 101
c=IN IP6 2001:DB8:ffff:2::efe:ce7b:1464
a=sendrecv
a=flowlabel:1234
a=flowstats:rfc3611
a=rtpmap:18 G729/8000
a=fmtp:18 annexb=no
a=rtpmap:101 telephone-event/800
a=fmtp:101 0-16
a=ptime:20
}

FIG. 4

FLOW STATE ATTRIBUTES FOR PRODUCING MEDIA FLOW STATISTICS AT A NETWORK NODE

TECHNICAL FIELD

The present disclosure relates generally to the field of data packet transmission over digital networks.

BACKGROUND OF THE INVENTION

A protocol is a set of procedures for communications over a network. In the Internet Protocol (IP), information such as the IP addresses of the sender (source) and the receiver (destination) of the data packets is placed in a "header" positioned in front of the data. In Internet Protocol version 6 (IPv6), which is an improved version of IPv4, a "flow label" field is included in the header. The flow label field plus the source and destination IP addresses can uniquely identify the data packets constituting a media flow in IPv6. With such an identifier for a media flow, packets can be differentiated and processed accordingly.

Among the problems that exist in the transmission of media streams over a digital network is how to allow routers to prioritize routing of certain media flows over other media flows, and the selection of physical resources (e.g., output interface) for a particular media flow. Solving these problems depends upon properly monitoring and attending to a media flow, which, in turn, requires the establishment of a flow state in IPv6. Unfortunately, establishing a flow state at the middle nodes in the transmission path is problematic.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

FIG. 3 illustrates an example media description with a flow label attribute.

FIG. 4 illustrates an example Session Description Protocol session containing two different types of flow label attributes.

DESCRIPTION OF EXAMPLE EMBODIMENTS

Figure 1:
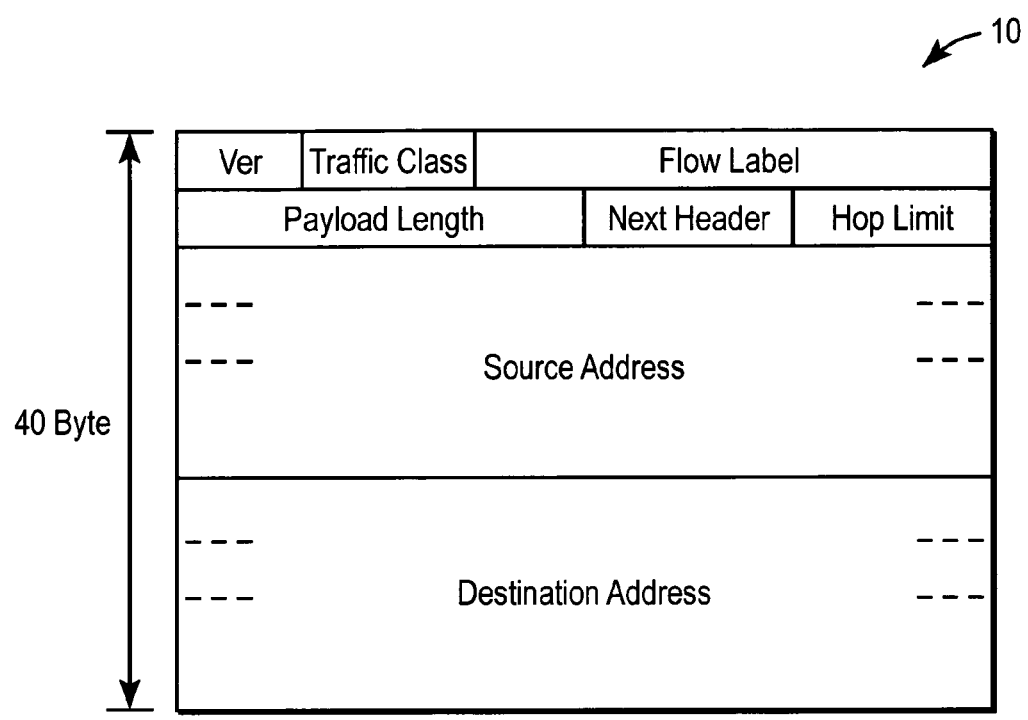
FIG. 1 illustrates an example IP header format that includes a flow label field.

In the following description specific details are set forth, such as device types, system configurations, protocols, methods, etc., in order to provide a thorough understanding of the subject matter disclosed herein. However, persons having ordinary skill in the relevant arts will appreciate that these specific details may not be needed to practice the embodiments described.

In the context of the present application, a communications system or network is a geographically distributed collection of interconnected subnetworks (e.g., enterprise networks, access networks, core networks, etc.) for transporting data between nodes, such as intermediate nodes and end nodes (also referred to as endpoints). A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the devices or nodes include servers, routers, switches, gateways, controllers (e.g., a Session Border Controller), and endpoint devices. The nodes typically communicate by exchanging discrete frames or packets of data according to predefined protocols.

A Session Border Controller (SBC) is a device used at a point of demarcation between one part of a network and another in a communications network to control signaling and usually also the media streams involved in setting up, conducting, and tearing down a media call (e.g., a voice over IP (VoIP) call). In the context of VoIP, each call consists of one or more signaling streams that control the call, and one or more media streams which carry the audio, video, or other media data along with information concerning how that data is flowing across the network. Together, these streams make up a media session, which consists of senders and receivers, as well as the media streams flowing between them.

The Session Description Protocol (SDP) documented in Request for Comments (RFC) 2327 is widely used as a platform or format to describe a media session. Description of a media session is typically encapsulated in the Session Initiation Protocol (SIP) documented in RFC 3261, or other session initiation protocols. In the context of the present disclosure, it should be understood that SDP may be used in a wide range of network environments and applications.

A gateway comprises a node or network element that provides a translation function between different networks. For example, a gateway may be a device that can connect and provide communications between a private branch exchange (PBX) switching system of an enterprise and an IP network. Gateways typically perform translations between the different transmission formats and communication procedures. In addition, a gateway may also support communications with, and translations between, endpoints and/or terminals operating in accordance with different protocols. A middle media node may also comprise a gateway device in the context of the present disclosure.

An IP-PBX is a private branch exchange (telephone switching system within an enterprise) that switches calls between VoIP (voice over Internet Protocol or IP) users on local lines while allowing users to share a certain number of external phone lines. An IP-PBX may also switch calls between a VoIP user and a traditional telephone user, or between two traditional telephone users in the same way that a traditional PBX does. In the context of the present application, an endpoint may comprise a telephone device (such as a VoIP or SIP phone), a personal digital assistant (PDA), a laptop or notebook computer, or any other device (including a gateway device), network node, component, element, or object capable of initiating or participating in voice, video, gaming, text, or other media packet-data exchanges via a communication network.

Overview

According to one embodiment, a generally-applicable mechanism for media monitoring is provided that utilizes one or more attributes added in the media description section of a SDP (RFC2327) media session. The attributes permit the establishment of a media-stats flow state to produce statistics (stats) for a media flow of interest. The new attributes are defined to communicate both the flow label and the statistical requirements associated between intended media nodes. In a specific embodiment, the attributes communicate the label of the media flow from its original sender to all receiver nodes as well as to all the media nodes residing on the media transmission path. That is, media stats are provided at all or some of the media nodes (including voice gateways, routers, SBCs, and other types of middle nodes) along the flow path. The media stats are not restricted to any specific media transport protocol e.g. Real-Time Transport Protocol (RTP).

Referring to FIG. 1, an example IP header 10 compatible with the IPv6 format is shown including a 20-bit flow label field. By using the flow label field, a packet's sender or intermediate (middle) node can specify a series of packets, (e.g., VoIP) as a flow, and request particular service for this flow. By checking IP layer information, which includes the source and destination addresses, certain communication devices may recognize media traffic flow and assign a particular priority to each media flow. The flow label field may also be utilized to facilitate identification of data requiring special handling, such as those involved in real-time applications.

Other fields shown in IP header 10 include a version ("Ver") field, which indicates the protocol version, i.e., version 6; a Traffic Class byte field used by the source and other nodes (e.g., routers) to identify packets belonging to the same traffic class, thus distinguishing between packets having different priorities; a next header field, which identifies the type of header immediately following IP header 10; a hop limit field that indicates the maximum number of nodes (hops) that a packet can cross before reaching its destination (this field is decremented by one for each node that the packet crosses; when the hop limit field reaches zero, the packet is discarded); a 128-bit source address field that contains the address of the originator of the packet; and a 128-bit destination address field, which is the address in the intended recipient or receiver of the packet.

The Flow Label field shown in the example of FIG. 1 is 20-bits in length. By using this field, the sender of a packet or intermediate devices can specify a series of packets, such as VoIP, as a flow, and request particular service for this flow. In one embodiment, specifying certain extended or new attributes allows a sender or intermediate node to establish a flow state for purposes of generating media statistics/measurements and provide them at the IP layer.

Figure 2:
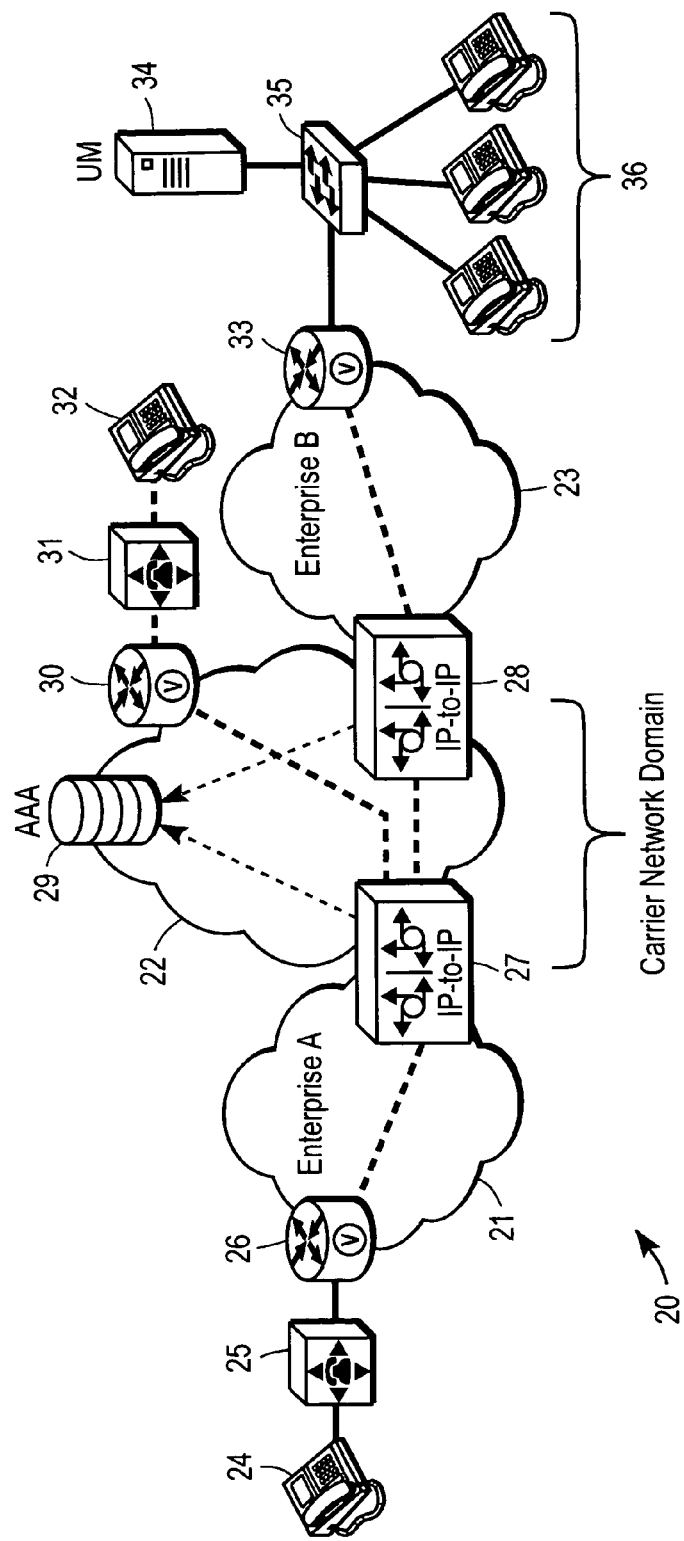
FIG. 2 illustrates an example media communications system.

FIG. 2 illustrates an example media communications system 20 which includes a number of voice gateways 26, 30 and 33 interconnected via a carrier network 22. For example, voice gateways 26 and 33 are shown connected to carrier network 22 via IP-to-IP gateways (i.e., provider edge (PE) devices) 27 and 28 across access networks 21 and 23, respectively. Each of the IP gateways 27 and 28 may communicate with an Authentication Authorization Accounting (AAA) server, which comprises a network server used for network access control. The authentication function identifies the user; the authorization function implements policies that determine which resources and services a valid user may access; and the accounting function keeps track of time and data resources used for billing and analysis. Voice gateway 30 is also shown directly connected to carrier network 22.

At the far right-hand side of FIG. 2, a set of endpoint devices (e.g., IP phones) 36 is shown connected to voice gateway 33 of the switch 35. A unified messaging (UM) system 34 is also shown connected to switch 35. Similarly, phone 32 is shown connected to voice gateway 30 via an IP-PBX system 31, and phone 24 is connected to voice gateway 26 of the IP-PBX system 25. Calls between the various endpoint devices are shown by the heavy dashed lines in FIG. 2. For example, FIG. 2 shows a call between endpoint devices 24 and 32 passing through voice gateway 26, IP-to-IP gateway 27, and voice gateway 30.

It is appreciated that although only one carrier/service network is shown in FIG. 2, other embodiments may comprise more than one carrier/service network. Media stats can be generated on a per core basis or on a per media session basis. Practitioners will appreciate that a media session can be either a video, audio, game, or other type of media content. In accordance with one embodiment, media stats can be generated for any particular RTP media streams, and in any segment of the media path within the network.

In accordance with one embodiment, a media session may consist of participants being a sender, a receiver, or both. Description of a media session is encapsulated in SIP (RFC3261) or other session initiation protocols. One or more attributes are added in the media description section of an SDP session to communicate the flow label of a media flow from its original sender to all the media nodes sitting on the media path and the receivers. If a media session contains two or more senders, each sender allocates a separate flow label of the media flow originated from the sender. If a sender generates multiple media flows, that sender should allocate one flow label for each flow, and communicate the allocated flow label to others through its corresponding media description in the SDP session.

In one implementation, the following media-level attribute is defined in this invention to communicate a flow label:
    a=flowlabel:<value>
    where <value> is a hexadecimal number, e.g., 0x1~0xfffff, that represents a valid flow label. FIG. 3 is an example media description in SDP with a flow label attribute having a value=1234. The flow label value may be any value assigned to the flow that uniquely identifies the flow with respect to the originating node. It should be understood that the flow label attribute value plus the IP source address is typically sufficient to uniquely identify all packets originating from a particular node for a particular flow. A sender may specify a flow label attribute for each media flow, if necessary.

Practitioners in the art will further appreciate that the first line in FIG. 3 (e.g., m=audio . . . ) denotes a media description; the second line (e.g., c=IN IP6 . . . ) denotes a connection; and the third line denotes an attribute that identifies the send & receive direction.

FIG. 4 illustrates an example SDP session containing two different types of flow label attributes. In a first portion 41 the illustrative SDP session, the following attribute may be used to establish a flow state for media statistics measurements:
    a=flowstats:rfc3550 doss ijitter
    where doss and ijitter stand for cumulative packet loss and inter-arrival jitter, respectively. Other parameters, such as fraction loss, etc., may also be listed in the flowstats attribute. In certain cases, a sender may want to specify only one parameter, e.g., loss; in other instances all of the parameters associated with a particular algorithm may be specified. Besides RFC3550, a number of other media algorithms or statistics may be specified by the sender. For example, the second portion 42 of the illustrative SDP session shown in FIG. 4 includes the following attribute, which indicates the need to generate all extended report (XR) statistics in accordance with RFC3611:
    a=flowstats:rfc3611

The flow stats attributes shown above can be added or removed by any middle node (under carrier control) in the media path that the RTP stream traverses, e.g., a voice gateway, IP-to-IP gateway, or SBC device. In other words, such flow stat attributes can be added and removed by a carrier/service provider's ingress and egress SBCs in order to monitor the media flow state within a service provider network. To increase granularity of media monitoring, the ingress SBCs may further convey the flow state into routers located in the media path between the ingress and egress SBCs via various header options embedded in the IPv6 destination options header. It is appreciated that with the use of the above flows stats attributes, both the ingress and egress SBCs are able to establish the flow state to perform measurements and record media flow stats.

Once a flow state has been established, it can be cancelled or modified by resending the SDP session without the unwanted flowlabel and flowstats attributes. Alternatively, a new flow without the flowlabel and flowstats attributes may be used for the cancellation purpose. Another possibility is to simply set the flow label value field for each flow to zero to disassociate the flow state previously established.

The example of FIG. 4 further illustrates the use of specific requirements may be utilized to override a set of general requirements applicable for all media streams. For instance, portion 41 of the example SDP session specifies general requirements applicable to all media streams. These requirements may be established or set by a sender or some other middle node in the media path. Portion 42 of the example SDP session shown in the lower half of FIG. 4 specifies flow stat measurements in accordance with RFC3611 for an audio media stream, which overrides the general requirements set forth in portion 41.

Thus, in this manner described above, under carrier control, a gateway, PE, or other SBC device can remove or add flow state attributes used to measure and generate media flow statistics—or turn off the flow state feature entirely—before passing the flow out to the next node or hop in the media path.

Figure 5:
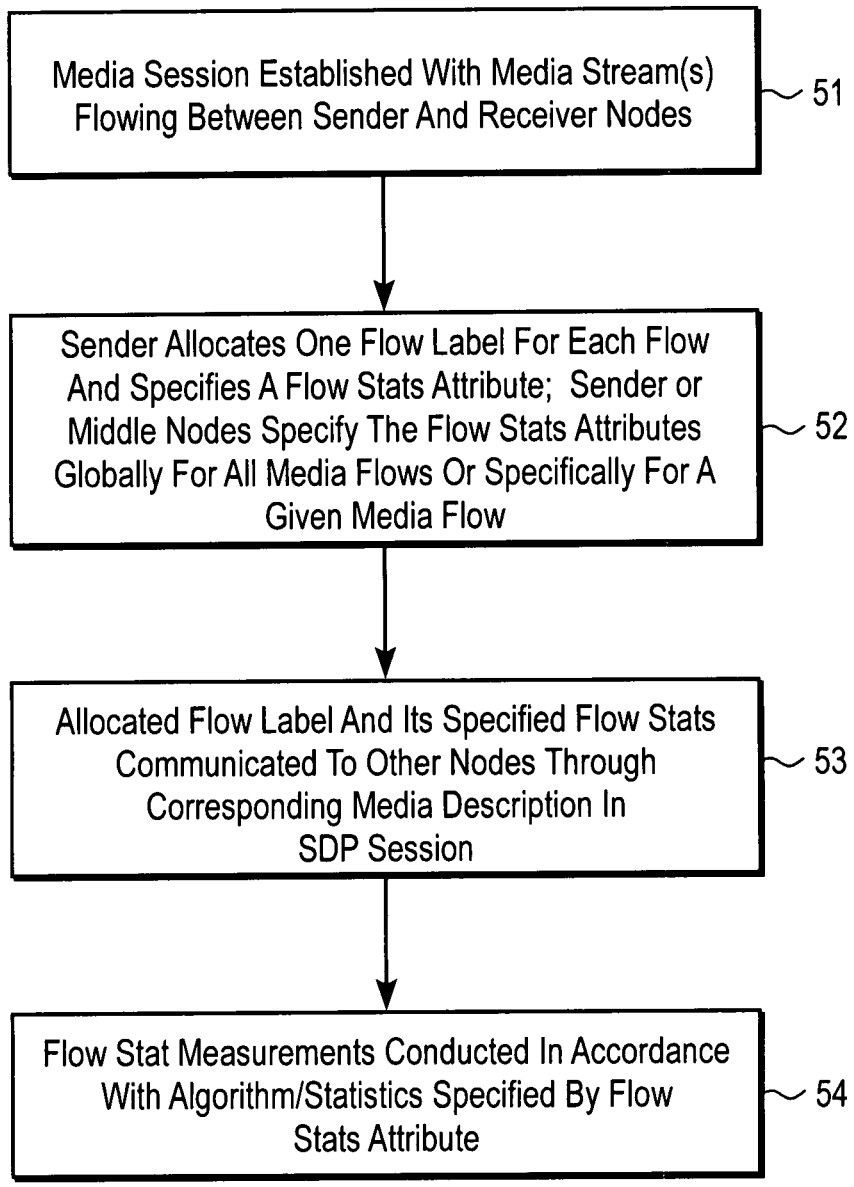
FIG. 5 illustrates an example method of operation for the media communications system of FIG. 2.

FIG. 5 illustrates an example method of operation for the media communications system of FIG. 2. The process begins with a media session already in progress; that is, the media and control channels to all of the participants have already been established and media streams are flowing between sender and receiver nodes (block 51). By way of example, the media session may comprise a VoIP phone call between two different endpoints. To establish a media-stats flow state that produces statistics for a media flow of interest, the sender may allocate one flow label for each flow, specifying a flow state attribute to generate the desired measurements/statistics (block 52). The allocated flow label (with the specified flow state attribute) is then communicated to other nodes in the network via the corresponding media description as part of the established SDP session (block 53). As discussed previously, the downstream nodes in the media path may remove the flow state attribute, override the specified flow state attribute, or add other flow state attributes. Thereafter, each middle node (and/or receiver node) in the media path performs the operations (i.e., measurements, generation of statistics) specified by the flow state attributes (block 54), thereby producing the monitoring information of interest.

Figure 6:
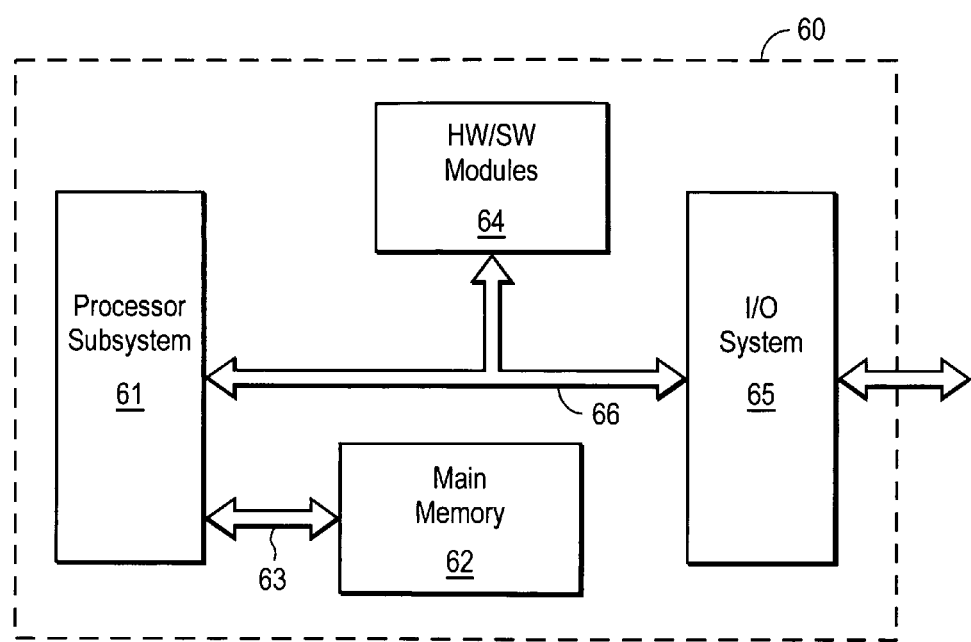
FIG. 6 illustrates an example network node or device.

FIG. 6 illustrates basic components of an example network device or node 60 (e.g., router, voice gateway, or IP gateway) such as that described above. Node 60 typically comprises a number of basic subsystems that includes a processor subsystem 61, a main memory 62 and an input/output (I/O) subsystem 65 that includes ingress and egress ports or interfaces for coupling to the network. Data is transferred between main memory ("system memory") 62 and processor subsystem 61 over a memory bus 63, and between the processor and I/O subsystems over a system bus 66. Examples of the system bus may include the conventional lightning data transport (or hyper transport) bus and the conventional peripheral component interconnect (PCI) bus. Processor subsystem 61 may comprise one or more processors and a controller device that incorporates a set of functions including a system memory controller, support for one or more system buses and direct memory access (DMA) engines.

Node 60 may also comprise other hardware/software modules 64 coupled to system bus 66 for performing additional functions. For example, modules 64 may include software, firmware, or logic embedded in hardware for implementing any of the functions described herein, e.g., those functions associated with establishing a flow state, media monitoring utilizing certain measurements, passing of attributes, performing operations upon media packets, etc. (In the context of the present application, therefore, the term "module" is to be understood as being synonymous with both hardware devices and computer-executable software code, programs or routines.)

It should be further understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards or other type of machine-readable medium suitable for storing electronic instructions.

Additionally, although the present invention has been described in conjunction with specific embodiments, numerous modifications and alterations are well within the scope of the present invention. For instance, although various RTP-based algorithms have been used in illustrative examples, it is appreciated that the same methods and functions described herein are generally applicable to media applications that are not RTP based. Accordingly, the specification and drawings are to be regarded in an illustrative rather than a restrictive sense.

We claim:

1. An apparatus comprising:
    an interface for coupling to an Internet Protocol version 6 (IPv6) network;
    one or more processors at a sender node operable to establish, over the interface, a Session Description Protocol (SDP) media session with one or more receiver nodes via a media transmission path of the IPv6 network operating in accordance with a media transport protocol, the media transmission path comprising one or more intermediate media nodes between the sender node and the one or more receiver nodes, the one or more processors being further operable to specify one or more attributes in a media description section of the SDP media session, the one or more attributes including:
    a first attribute to communicate a label that identifies a media flow to the one or more receiver nodes as well as to the one or more intermediate media nodes residing on the media transmission path; and
    a second attribute that allows the sender node or the one or more intermediate media nodes to establish a flow state for generating media flow information, the media flow information comprising media statistics/measurements generated either on a per network core basis or on a per media session basis; and
    wherein the one or more attributes are added by the one or more processors in the media description section of the SDP media session to communicate the label from the sender node to the one or more intermediate media nodes and the one or more receiver nodes in the media transmission path, the one or more intermediate media nodes being operable to add or remove the one or more attributes specified in the media description section, whereby, one or more further intermediate media nodes are further operable to generate the media flow information based on attributes added by the one or more intermediate media nodes and stop generating the media flow information based on attributes removed by the one or more intermediate media nodes.

2. The apparatus of claim 1 wherein the media transport protocol comprises Real-Time Transport Protocol (RTP), the media statistics/measurements being generated for any particular media stream of the SDP media session and in any segment of the media transmission path.

3. The apparatus of claim 1 wherein the one or more intermediate media nodes further include routers.

4. The apparatus of claim wherein the second attribute is removable by any one of the one or more of the intermediate media nodes.

5. The apparatus of claim 1 wherein the media flow information comprises cumulative packet loss.

6. The apparatus of claim 1 wherein the media flow information comprise inter-arrival litter.

7. The apparatus of claim 1 wherein the media flow information comprises Extended Report statistics as defined in Request For Comments (RFC) 3611.

8. An apparatus comprising:
an ingress port and an egress port for connection in a media transmission path of an Internet Protocol version 6 (IPv6) network operating in accordance with a media transport protocol, the media transmission path including a sender node and one or more receiver nodes, the ingress port and egress port each being located between the sender node and the one or more receiver nodes in the media transmission path;
one or more processors coupled to the ingress port and the egress port operable to transmit, via the egress port, packets received at the ingress port to a next node in the media transmission path, the packets comprising a Session Description Protocol (SDP) media session that includes one or more attributes specified in a media description section of the SDP media session, the one or more attributes specifying one or more general requirements applicable to all media streams originating from the sender node, the one or more attributes including at least a first attribute that communicates a label to identify a media flow from the sender node to the one or more receiver nodes as well as to intermediate media nodes residing on the media transmission path, the one or more processors being further operable to remove or add a second attribute that establishes a flow state used to generate media flow statistics, and override the one or more general requirements with a different flow state attribute that generates the media flow statistics, and communicate the flow state to a set of the intermediate media nodes downstream in the media transmission path, whereby, the one or more processors are further operable to generate media flow statistics based on second attributes added by the intermediate media nodes and stop generating media flow statistics based on second attributes removed by the intermediate media nodes.

9. The apparatus of claim 8 wherein the flow state provides at least a number of the intermediate media nodes with the media statistics.

10. The apparatus of claim 8 wherein the media flow statistics comprise cumulative packet loss.

11. The apparatus of claim 8 wherein the media flow statistics comprise inter-arrival jitter.

12. The apparatus of claim 8 wherein the media flow statistics comprise Extended Report statistics as defined in Request For Comments (RFC) 3611.

13. A method comprising:
receiving, at a first intermediate node of a plurality of intermediate nodes in a media transmission path between a sender node and a receiver node, a flow label attribute identifying a media flow associated with a Session Description Protocol (SDP) media session, the flow label attribute comprising a unique value assigned to the media flow by the sender node, the media flow being between the sender node and the receiver node over the media transmission path that traverses an Internet Protocol version 6 (IPv6) network;
receiving, at the first intermediate node, a first flow state attribute that allows the plurality of intermediate nodes in the media transmission path to generate first media flow information, the first media flow information comprising media statistics generated either on a per network core basis or on a per media session basis;
adding, by the first intermediate node, a second flow state attribute that allows the plurality of intermediate nodes in the media transmission path to generate second media flow information; and
communicating the flow label and the first and second flow state attributes to a second intermediate node of the plurality of intermediate nodes in the media transmission path, the first flow state attribute and the second flow state attribute being removable by the second intermediate node;
wherein the flow label attribute, the first flow state attribute and the second flow state attribute are located in a media description section of the SDP media session.

14. The method of claim 13 wherein the first media flow information comprises cumulative packet loss.

15. The method of claim 13 wherein the first media flow information comprises inter-arrival jitter.

16. The method of claim 13 wherein the first media flow information comprises Extended Report statistics as defined in Request For Comments (RFC) 3611.

17. The method of claim 13 further comprising performing, by the first intermediate node, one or more measurements specified by the second flow state attribute.

* * * * *